United States Patent [19]
Porsche

[11] 3,731,079
[45] May 1, 1973

[54] SWINGABLE HEADLIGHT FOR VEHICLES
[75] Inventor: Ferdinand Anton Ernst Porsche, Stuttgart-Nord, Germany
[73] Assignee: Firma Dr-Ing. H. C. Porsche K. G., Zuffenhausen, Germany
[22] Filed: Oct. 27, 1970
[21] Appl. No.: 84,418

[30] Foreign Application Priority Data
Nov. 8, 1969    Germany.....................P 19 56 346.3

[52] U.S. Cl..........................240/7.1 H, 49/26, 180/82
[51] Int. Cl.............................B60k 27/08, B60q 1/04
[58] Field of Search.........................240/7.1 H; 49/26, 49/141, 383; 180/82; 16/168

[56] References Cited
UNITED STATES PATENTS

| | | | |
|---|---|---|---|
| 2,331,340 | 10/1943 | Mosher | 49/383 |
| 2,686,942 | 8/1953 | Spector | 49/383 |
| 3,284,623 | 11/1966 | Neal | 240/7.1 H |
| 2,338,541 | 1/1944 | Roedding | 240/7.1 H |
| 3,424,263 | 1/1969 | Black | 180/82 |
| 3,442,048 | 5/1969 | Elias | 49/141 |
| 2,962,782 | 12/1960 | Beach | 16/168 X |

FOREIGN PATENTS OR APPLICATIONS
506,415    6/1929    Germany..........................240/7.1 H Primary Examiner—Louis R. Prince
Assistant Examiner—Daniel M. Yasich
Attorney—Craig and Antonelli

[57] ABSTRACT

A headlight mounting arrangement for vehicles utilizing headlights of the type that are pivoted from an in-use position above the surrounding surfaces of the vehicle body to a stored or rest position in an opening in the vehicle body. The structural element forming the forward outwardly facing edge of the opening within which the headlight is to be pivoted into is constructed so as to be movable in response to a force thereon such that the limb of a person that may be inadvertently positioned adjacent the front of the headlight when the headlight is being pivoted into the opening is protected from being squeezed between the headlight and the structural element. The structural element is mounted at the adjoining fixed vehicle body structure by way of yieldable elements in the form of pins. One embodiment of the invention utilizes pins with a constricted portion acting as shear pins, while another embodiment utilizes a two part disengagable pin structure. The structural element is contoured to smoothly blend with the surrounding body structure under normal use.

28 Claims, 5 Drawing Figures

Inventor:
FERDINAND ANTON ERNST PORSCHE
BY Craig, Antonelli, Stewart + Hill
ATTORNEYS

SWINGABLE HEADLIGHT FOR VEHICLES

BACKGROUND OF THE INVENTION

The present invention relates to a headlight for vehicles, especially motor vehicles, and more particularly, to a headlight which is so constructed as to be swung or pivoted from its working or in-use position into an opening of the vehicle structure.

In a known construction such as shown in British Pat. No. 1,010,728, the headlight is mounted swingably at the body of the motor vehicle and is retractable into an opening thereof with the parts adjacent to the opening being rigidly connected to the vehicle body. This arrangement has the disadvantage, however, that, during a swinging or pivoting motion of the headlight from, for example, the operating position into the rest position, the limb of a person standing close to the vehicle can possibly be caught between parts of the headlight and the edges of the opening in the vehicle body, thereby making serious injuries unavoidable.

SUMMARY OF THE INVENTION

It is an aim of the present invention to overcome the problems and disadvantages encountered in the prior art arrangements.

More particularly, it is an object of the present invention to provide favorably designed structural components which surround or delimit a swingable or pivotable headlight. In this connection, the present invention is based on the construction of parts which define the opening of the swingable or pivotable headlight in such a manner so as to be fully sufficient for meeting the safety requirements.

The foregoing problems and disadvantages have been solved in accordance with the present invention by providing that the opening in the body is bounded or surrounded at least in part by a structural component which can change its position, i.e. position-variable. To this end, it is advantageous to provide that the structural component is constructed yieldingly at least in parts thereof. It is further advantageous to make the structural component of a form-stable material. It is also advantageous to hold the structural component at the body by yielding elements which are preferably provided with cross-sectional constrictions.

In accordance with another feature of the present invention, releasable members are provided for holding the structural component. For this, it is advantageous to make the members of a form-rigid and a yielding structural component. The structural component is, in its assembled or mounted position, preferably matched to the shape of the defining or delimiting walls of the body. If the headlight is constructed so as to be swingable or pivotable about an axis extending perpendicular to the longitudinal axis of the vehicle, it is also advantageous to provide that the position-variable structural component be located adjacent to the side of the headlight which is remote from the pivot axis of the headlight.

In accordance with still a further feature of the present invention, the structural component is arranged in the direction of travel or drive ahead of the headlight, and it is of further advantage to make the basic shape of the structural component in the form of a U-shape.

The advantages obtained with the present invention reside essentially in that, through the variable-position structural component and construction of the same defining the opening, a safety device is provided which will protect a person standing next to the vehicle from any injuries to the body limb due to being caught between the headlight and structural component during, for example, the closing movement of the headlight.

Accordingly, it is an aim of the present invention to provide a swingable headlight which is simple and effective through the yielding construction and of the structural component.

It is still a further object of the present invention to provide a swingable headlight which can be arranged in a simple manner on the body of the vehicle due to the form-rigid construction of the structural component.

It is still a further object of the present invention to provide a swingable headlight, wherein the elements make an effective yielding of the structural component possible during loading.

It is yet another object of the present invention to provide the elements with cross-sectional constrictions which effect a separation thereof during large loads.

It is another object of the present invention to create a highly effective safety device which, after disengagement, may be aligned into the correct position in a simple manner by means of the support of the structural component through means of disengageable members.

BRIEF DESCRIPTION OF THE DRAWING

These and further features, objects and advantages of the present invention will become more apparent from the following description when taken in conjunction with the accompanying drawing which shows, for purposes of illustration only, several embodiments in accordance with the present invention and wherein.

DETAILED DESCRIPTION OF THE DRAWING

Figure 1:
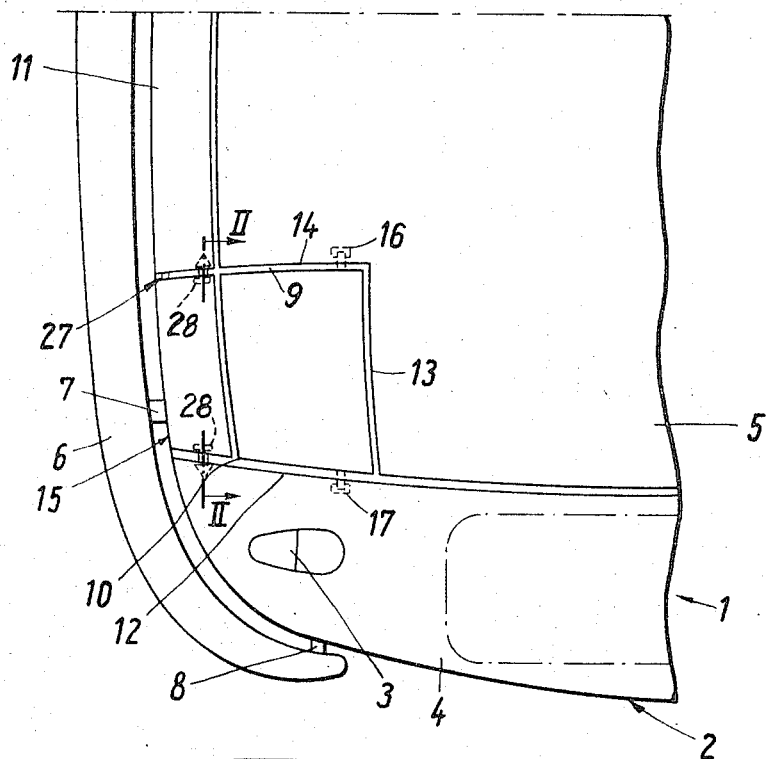
FIG. 1 is a top view of the nose of a motor vehicle in accordance with the present invention.

Referring now to the drawing and, in particular, to FIG. 1, the motor vehicle 1 includes a body 2 which, in the illustrated portion, is provided with a side member or portion 4 including a blinker lamp 3 and a cap or hood 5 which is swingably arranged on hinges (not shown). The boundary of the body structure 2 forms an impact-absorbing device or bumper 6 which is detachably held to the structure by attaching means 7,8. Further, a headlight 10 which is housed in an opening 9 of the body structure 2 and a nose portion 11 are provided on the structure 2.

The opening 9 is bounded by a wall 12 of the side portion 4 and sections 13, 14 of cap or hood 5. Opposite to the section 13, there is provided a structural element 15 which also bounds or delimits opening 9 and is constructed so as to be position-variable.

Headlight 10 may be rotated about two bearing pins 16, 17 extending perpendicular to the vehicle longitudinal axis and from an operating position into a submerged or concealed rest position. The two bearing pins 16, 17 are shown schematically in FIG. 1. The operation of the headlight 10 is accomplished by means of an electric motor and a lever mechanism (not shown). However, hydraulic and/or manually-controlled operating devices may be provided instead.

Figure 2:
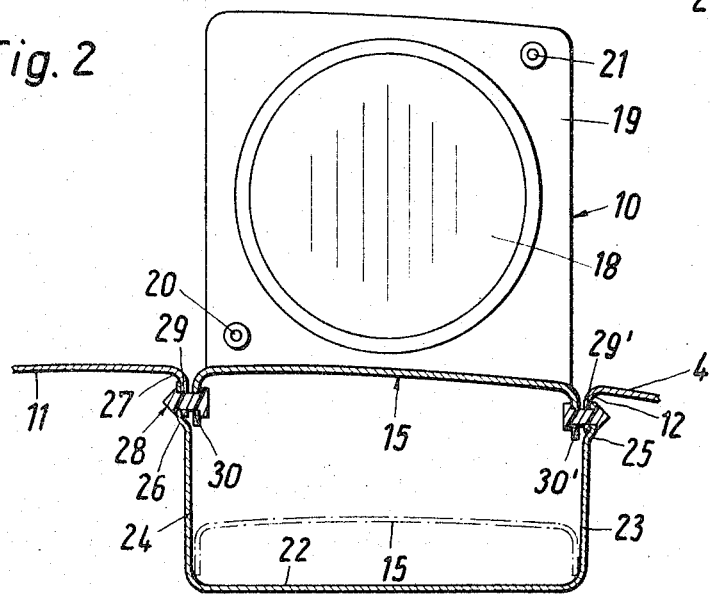
FIG. 2 is a sectional view along line II—II of FIG. 1 on an enlarged scale with the headlight rotated into operating position.

As shown in FIG. 2, the headlight 10 which is rotated into the operating position is provided with a dispersion window 18 which is held in a housing 19 and may be adjusted by means of adjusting screws 20, 21. Opening 9 into which the headlight may be swung is defined or bounded by means of a pot-like structural element 22 which is provided with upright sections 23, 24, the free ends 25, 26 of which are connected with wall 12 of the side portion 4 and a wall 27 of the nose end part 11 respectively by means of welding, riveting and the like.

Between the walls 12 and 27, there extends the position-varying structural element 15 which consists of a form-rigid material and has an approximately U-shaped form. The structural element 15 is held at the wall by means of the yielding elements 28. For this purpose, bores are provided at 29, 29' and 30, 30' through which the yielding elements 28 extend to hold the structural element 15 in position. The latter may, however, be also made of a yielding material or may only be provided with yielding sections.

Figure 3:
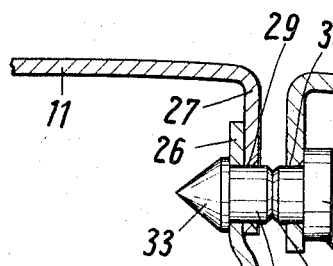
FIG. 3 is a detail portion of FIG. 2 on an enlarged scale.

In accordance with FIG. 3, element 28 includes a head piece 31 and shaft 32 onto which a cone-shaped end piece 33 is attached. The end piece 33 is dimensioned and shaped in such a manner that, during assembly, it passes easily through the bores 29 and 30 but resists an undesirable loosening 1 in the assembled condition. Further, shaft 32 is provided with a cross-sectional constriction 34 so that the yielding element 28 is separated when high loads act upon the structural element 15.

The function of the above-described device is best explained in connection with FIGS. 1 and 2. When the limb of a person gets caught between housing 18 of the headlight 10 and the structural element 15 during the rotation of the headlight into a rest position, the flexible elements 28 yield in such a manner that injury to the person is extensively avoided. If the elements 28 are loaded excessively, as when the limb of a person gets caught between the housing 18 and the structural element 15, the elements 28 will be separated at the cross-sectional constrictions 34 and the structural element 15 will be brought into a position shown by the dot-dash lines in FIG. 2.

Figure 1A:
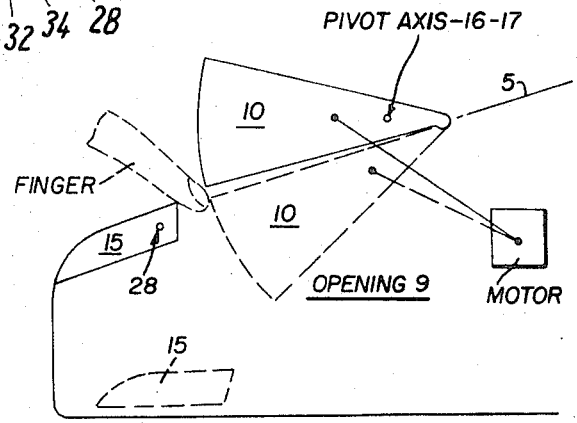
FIG. 1A is a partial schematic view taken in the direction perpendicular to the longitudinal driving direction of the vehicle shown in FIG. 1.

FIG. 1A schematically illustrates the operation of the present invention with the solid line showing of headlight 10 indicating the use position and the dash line indicating the storage position. In the event a person's finger or the like is caught between the structural element 15 and the headlight 10, the connecting elements 28 are disengageable from structural element 15 to permit it to fall into the opening 9 in the position shown in dash lines.

Figure 4:
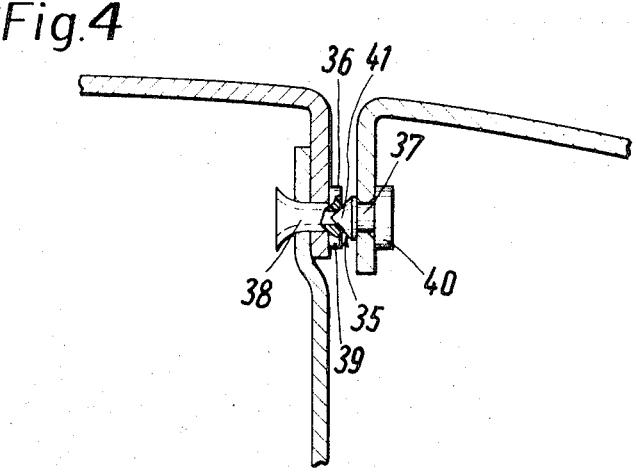
FIG. 4 is a detail portion similar to FIG. 3 but illustrating a further embodiment in accordance with the present invention.

Another embodiment in accordance with the present invention is shown in FIG. 4 for the connection of the structural element. Here, a releasable member 35 is provided which includes a receiving portion 36 and a centering portion 37. The receiving portion 36 is preferably made from a suitable, form-rigid material such as, for example, synthetic material, and is also provided with a bore 38. The releasable member 35 also includes a collar 39 and is fastened on its free end by rivets or the like in a known manner. The centering portion 37 consists of an elastic material and includes a head portion 40 and a cone section 41 which cooperates with the bore 38 of the receiving part 36. This arrangement therefore makes possible a simple and bearing-correct assembly or mounting of the structural element 15 even after complete disengagement into the provided assembly position.

While I have shown and described several embodiments in accordance with the present invention it is to be clearly understood that the same is susceptible of numerous changes and modifications as will be apparent to one of ordinary skill in the art. For example, a device could be provided which would be swingably arranged and/or under spring tension on the body. I, therefore, do not wish to be limited to the details shown and described herein but intend to cover all such changes and modifications as are encompassed within the scope of the present invention.

I claim

1. A headlight arrangement for use in a vehicle of the type having headlights which are swingable from an in-use position to a rest position in an opening of the vehicle body; said arrangement comprising: vehicle body structure delimiting outwardly facing edges of an opening for accepting a headlight, pivotal supporting means for supporting a headlight for pivotal movement about a pivot axis into and out of said opening, said vehicle body structure including a structural element defining a part of the edges of said opening, and force responsive means for permitting the relative movement of at least part of said structural element with respect to the pivot axis of said pivotal supporting means in response to a predetermined force on said structural element, whereby the danger to a limb of a person or the like which may inadvertently be located between the headlight and the edges of the opening during movement of the headlight is reduced, wherein said pivotal supporting means is constructed such that said pivot axis is located in a fixed position with respect to the parts of the vehicle body structure other than said structural element which delimit the edges of said opening, wherein said force responsive means forms part of connecting means for connecting the structural element to adjacent relatively fixed vehicle structure, and wherein the connecting means includes yielding elements.

2. An arrangement according to claim 1, wherein the structural element is made of a form-rigid material.

3. An arrangement according to claim 1, wherein the yielding means have a cross-sectional constricted portion.

4. Headlight according to claim 3, wherein the structural element is made of a form-rigid material.

5. An arrangement according to claim 1, wherein said force responsive means includes disengagable means connecting the structural element at the vehicle body.

6. An arrangement according to claim 5, wherein the structural element is made of a form-rigid material.

7. An arrangement according to claim 5, wherein the disengageable means are constructed of form-rigid and yielding members.

8. An arrangement according to claim 1, wherein the structural element, in its assembled position, matches the shape of adjacent boundary walls of the vehicle body.

9. An arrangement according to claim 1, wherein the pivot axis extends perpendicularly to the driving direction of the vehicle, and wherein the structural element borders on the side of the headlight remote from the pivot axis.

10. An arrangement according to claim 9, wherein the structural element is arranged ahead of the headlight in the driving direction.

11. An arrangement according to claim 1, wherein the structural element is approximately U-shaped in cross-section.

12. An arrangement according to claim 11, wherein the structural element is made of a form-rigid material.

13. An arrangement according to claim 1, wherein the yielding elements are constructed as pins extending through respective apertures in both said structural element and the adjacent relatively fixed vehicle structure.

14. An arrangement according to claim 13, wherein said pins include a constricted cross-sectional area which permits shearing of said pins when a predetermined force is applied to said structural element.

15. An arrangement according to claim 14, wherein said opening includes a bottom wall for catching and holding said structural element in the event the pins are sheared.

16. A headlight arrangement for use in a vehicle of the type having headlights which are swingable from an in-use position to a rest position in an opening of the vehicle body; said arrangement comprising: vehicle body structure delimiting outwardly facing edges of an opening for accepting a headlight, pivotal supporting means for supporting a headlight for pivotal movement about a pivot axis into and out of said opening, said vehicle body structure including a structural element defining a part of the edges of said opening, and force responsive means for permitting the relative movement of at least part of said structural element with respect to the pivot axis of said pivotal supporting means in response to a predetermined force on said structural element, whereby the danger to a limb of a person or the like which may inadvertently be located between the headlight and the edges of the opening during movement of the headlight is reduced, wherein said force responsive means forms part of connecting means for connecting the structural element to adjacent relatively fixed vehicle structure, and wherein the connecting means includes two part disengageable means, one part of said disengageable means being fixed to said structural element and the other part of said disengageable means being fixed to said adjacent relatively fixed vehicle structure, and wherein said two parts are disengageable from one another upon the application of a predetermined force on said structural element.

17. An arrangement according to claim 16, wherein the two part disengageable means is constructed as a two part pin, the respective parts of said pin extending through corresponding apertures provided in the respective structural element and adjacent fixed vehicle structure.

18. An arrangement according to claim 17, wherein one part of said pin includes a conical recess for accepting a conical end portion provided on said other part.

19. An arrangement according to claim 17, wherein said pin extends parallel to and spaced from said pivot axis of the headlight.

20. A headlight arrangement for use in a vehicle of the type having headlights which are swingable from an in-use position to a rest position in an opening of the vehicle body; said arrangement comprising: vehicle body structure delimiting outwardly facing edges of an opening for accepting a headlight, pivotal supporting means for supporting a headlight for pivotal movement about a pivot axis into and out of said opening, said vehicle body structure including a structural element defining a part of the edges of said opening, and force responsive means for permitting the relative movement of at least part of said structural element with respect to the pivot axis of said pivotal supporting means in response to a predetermined force on said structural element, whereby the danger to a limb of a person or the like which may inadvertently be located between the headlight and the edges of the opening during movement of the headlight is reduced, wherein said structural element is constructed U-shaped with the legs of the U facing inwardly from the outer surface of adjoining fixed vehicle parts, the joining part of the U matching the outer surface of the adjoining fixed vehicle part, whereby the structural element and the adjoining fixed vehicle parts form a substantially uninterrupted outwardly facing surface when said structural element is in the assembled condition with no external forces acting thereon.

21. An arrangement according to claim 20, wherein said force responsive means includes yielding means holding the structural element at the vehicle body.

22. An arrangement according to claim 21, wherein the yielding means have a cross-sectional constricted portion.

23. An arrangement according to claim 22, wherein the structural element, in its assembled position, matches the shape of the boundary walls of the vehicle body.

24. An arrangement according to claim 23, wherein the pivot axis extends perpendicularly to the driving direction of the vehicle, and wherein the structural element borders on the side of the headlight remote from the pivot axis.

25. An arrangement according to claim 20, wherein said force responsive means forms part of connecting means for connecting the structural element to adjacent relatively fixed vehicle structure.

26. An arrangement according to claim 20, wherein said pivotal supporting means is constructed such that said pivot axis is located in a fixed position with respect to the vehicle body structure other than said structural element which delimits the edges of said opening.

27. An arrangement according to claim 20, wherein said force responsive means forms part of connecting means for connecting the structural element to adjacent relatively fixed vehicle structure.

28. An arrangement according to claim 20, wherein said force responsive means form part of connecting means for connecting the legs of the U-shaped structural element to adjacent relatively fixed vehicle structure.

* * * * *